June 16, 1959 — H. C. FRENTZEL — 2,890,549
BELT SPLICE FORMERS
Filed April 14, 1958
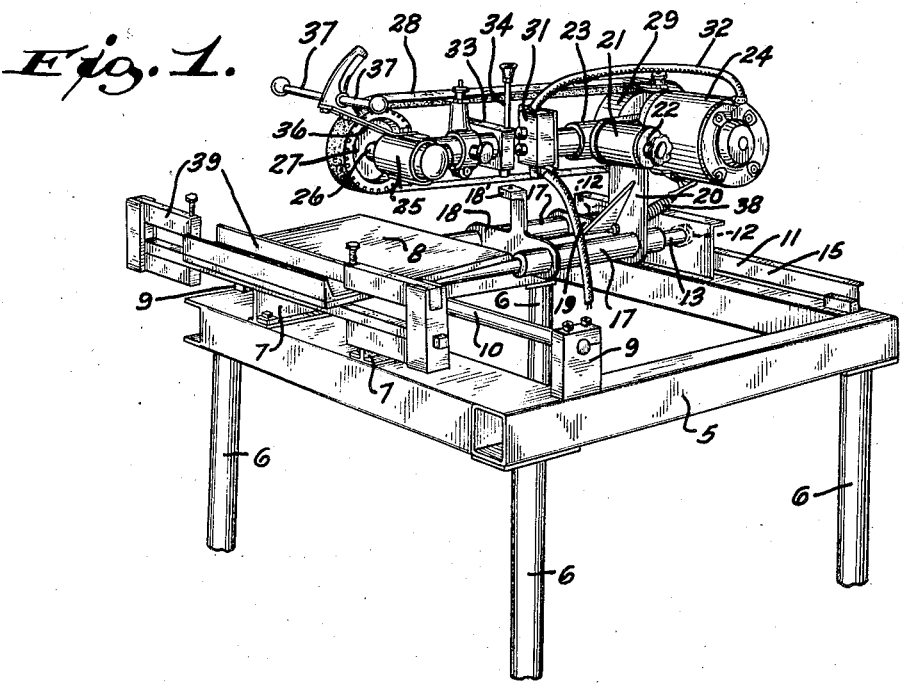
Fig. 1.
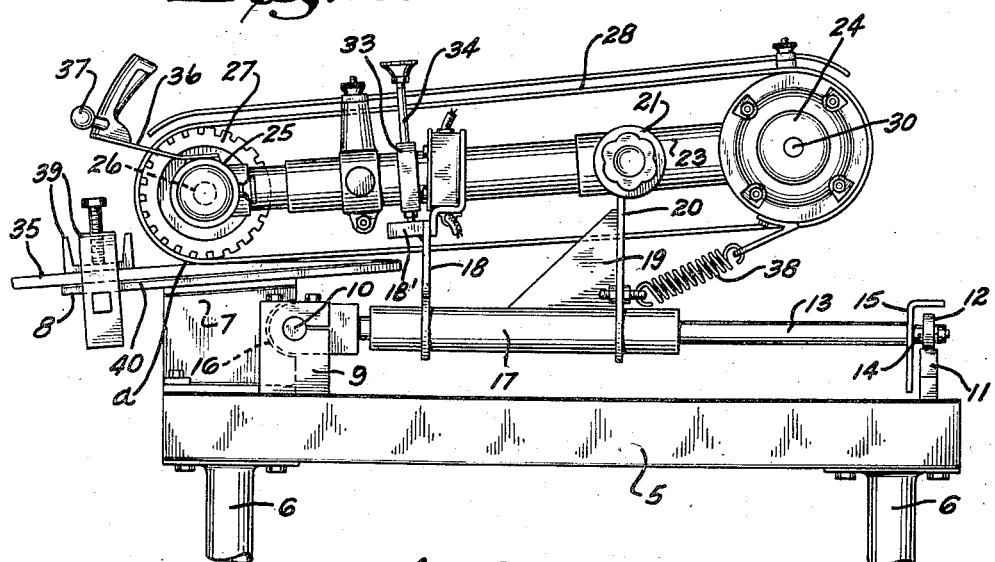
Fig. 2.
Fig. 3.
INVENTOR.
Herman C. Frentzel,
BY Morsell & Morsell
ATTORNEYS.

United States Patent Office 2,890,549
Patented June 16, 1959

2,890,549

BELT SPLICE FORMERS

Herman C. Frentzel, Milwaukee, Wis.

Application April 14, 1958, Serial No. 728,270

8 Claims. (Cl. 51—142)

This invention relates to improvements in belt splice formers.

Flat industrial transmission and conveyor belts, when not linked together at their adjacent ends by mechanical splices such as pins or staples, are joined by spliced joints wherein the lapping ends are complementally bevelled and glued together. Customarily, the bevelling of the complementary ends of the belt for the splice is effected by the hand operation of a tool, which is laborious, time-consuming and requires an undue amount of skill to obtain a well fitting joint. This problem is accentuated in respect to bevelling the adjacent ends of a multi-ply belt which may consist of outer layers of leather with one or more intermediate or interposed layers of plastic, which type of belt presents the problems of cutting materials of different hardness.

With the above in mind, it is, therefore, a primary object of the present invention to provide a belt splice former wherein the end portions of a belt which are to be bevelled for lapping engagement and securement by glue or the like, may be expeditiously and accurately bevelled to a desired angle within certain limits, by a power operated grinding mechanism having a pantographic mounting.

A further object of the invention is to provide a belt splice former wherein the end portion of the belt to be formed with a bevel for splicing is clamped onto a table or platen which may be adjusted to a predetermined inclination, and the associated grinding mechanism is rockingly carried by a carriage susceptible of horizontal movement transversely and fore and aft over the surface of the platen in a manner to maintain a predetermined plane relative to the work on the platen.

A further object of the invention is to provide a belt splice former provided with adjustable means for limiting the downward rocking movement of the arm which carries the grinding mechanism, whereby a setting will insure proper contact as between the grinding mechanism or tool and the work, but will prevent the grinding mechanism or tool from contacting and damaging the table or platen on which the work is mounted.

A further object of the invention is to provide a belt splice former which is of very simple construction, which is easy to operate, which securely clamps the work and prevents undesired displacement thereof, which permits relatively rapid formation of belt splices of superior quality, and which is well adapted for the purposes described.

With the above and other objects in view, the invention consists of the improved belt splice former, and its parts and combinations as set forth in the claims, and all equivalents thereof.

In the accompanying drawings, in which the same reference characters indicate the same parts in all of the views:

Fig. 1 is a perspective view of the improved belt splice former with the lower end portions of the table supporting legs being broken away;

Fig. 2 is a side view of the improved belt splice former on a slightly larger scale and with the supporting legs broken away; and Fig. 3 is an enlarged fragmentary side view of the platen showing adhesive tape interposed between the work and the platen face.

Referring now more particularly to the drawing, it will appear that the belt splice forming mechanism is operatively mounted on a table-like structure which includes a framelike horizontal base 5 secured to and carried by the upper ends of vertical supporting legs 6. Rigidly bolted to the forward portion of the horizontal base 5 are a pair of upright supports 7 which carry the work supporting table or platen 8. The platen 8 is supported on the inclined upper flanges of the upright supports 7 at a selected angle which is preferably one-eighth of an inch per one inch length of belt supported thereby. However, if desired the platen may be adjustable to vary its angularity.

Rigidly mounted on opposite sides of the horizontal base 5, rearwardly of the upright supports 7, are block-like supports 9, each of which has clamped therein an outer end of a lateral guide rod 10.

Rigidly mounted on the rear portion of the horizontal base 5 is a transversely extending track 11 on the top surface of which rollers 12 ride, the latter being revolubly mounted on the reduced rear end portions of spaced-apart fore and aft guide rods 13. The rollers 12 may be preferably of the ball bearing type and are interposed between washers 14. The numeral 15 designates a flanged spacer and guard for the bearing-equipped rear end portions of the fore and aft guide rods 13. The forward end portions of the spaced-apart fore and aft guide rods 13 are formed as bearings 16, as shown in Fig. 2, and slidably embrace the lateral guide rod 10. It will thus be seen that the spaced-apart fore and aft guide rods 13, slidable at their forward ends on the lateral guide rod 10 and at their rear ends on the transverse track 11, are susceptible of lateral movement above the top surface of the horizontal base 5 and permit all the mechanism carried by said rods 13 to be moved horizontally laterally of the table top, as will hereinafter appear.

In addition to the lateral movement of the mechanism carried by said guide rods by virtue of the mounting above described, said mechanism may also have a fore and aft movement. For this purpose sleeves 17 are longitudinally slidably mounted on intermediate portions of the fore and aft guide rods 13. Said sleeves 17 may enclose ball bearings (not shown) to facilitate their movement on the guide rods 13. The forward end portions of the spaced-apart parallel sleeves 17 are joined by a transverse brace 18 whose intermediate portion projects upwardly and is formed with a stop flange 18'. The rear end portions of the sleeves 17 are joined by an eccentrically shaped brace 19 having an upstanding portion 20 which carries at its upper end a motor arm pivot bearing 21. A transverse pivot shaft 22, to turn within said bearing 21 on a horizontal axis, is affixed at its inner end to an arm 23 which is connected to and projects forwardly from the casing of an electric drive motor 24.

At the forward end of the arm 23 there is mounted a transverse bearing 25 in which is journaled a shaft 26 which carries fast on its outer end a grinding pulley 27. As shown, said grinding pulley 27 has a serrated periphery which engages one end portion of an endless grinding belt 28. The other end portion of the grinding belt 28 is trained about a driven pulley 29 carried fast by an outer end portion of the motor shaft 30. An intermediate portion of the rockable arm 23 also carries a start-and-stop switch box 31 which intersects the circuit wire cable 32 which extends to the electric motor. The outer end of the circuit wire cable 32 may be connected with a source of electricity. Also carried by an intermediate portion of the arm 23 is a bearing block 33 into which is threaded the vertical shank portion of a grinder adjustment screw 34. By turning said adjustment screw 34 inwardly or outwardly, the proximity of its lower outer end relative to the stop flange 18' may be varied. Abutment of the lower end of the adjustment screw 34 with the stop flange 18' will serve to adjustably limit the downward swinging movement of the outer end of the arm 23 which carries the grinding pulley 27 and the engaged grinding belt 28. The effective grinding point of the belt is approximately at the point designated $a$ in Fig. 2 and by limiting the arc of rocking movement of the arm 23 the operator may insure proper grinding of the surface of the belt end 35 supported on the platen 8 without grinding or damaging the surface of the platen.

Essentially, that portion of the mechanism which includes the fore and aft rods 13, the sleeves 17, the braces 18 and 19, and the rockable arm 23, may be termed a "carriage" which mounts the driving motor 24, the pulleys 27 and 29 and the grinding belt 28. This entire carriage is susceptible of transverse movement over the surface of the platen 8 and fore and aft movement relative thereto and it operates in the nature of a pantograph so that the grinding surface of the belt 28 at point $a$ always remains in a fixed plane relative to work on the platen for a predetermined setting, as the belt end portion 35 is mounted on the platen 8 at a fixed angle to the plane of the grinder surface which thereby insures the formation of a true wedge or taper in the end portion of the belt 35 being operated on.

For the purpose of manually rocking the arm 23 on its horizontal pivot 22 and for moving the grinder pulley end of the entire carriage assembly over the surface of the belt 35 on the platen 8, both transversely and fore and aft, the bearing 25 at the outer end of the arm 23 has affixed thereto one end portion of an arm 36 which carries handlebars 37. Rocking movement of the arm 23 in a vertical plane, accomplished by the operator's manual pressure on the handlebars 37, is against the tension of a coiled spring 38 anchored between the portion 20 of the brace 19 and a portion of the motor casing.

It is essential that the end portion 35 of the belt to be tapered for splicing be firmly clamped onto the surface of the platen 8 so that it will not shift, become displaced or wrinkle. For that purpose conventional tape 40 having an adhesive on both surfaces is affixed to the top surface of the platen 8 and then the end portion of the belt 35 is applied smoothly onto the top surface of the platen, but overlying the upper adhesive face of the tape. The inclination of the platen 8, and hence of the end portion of the belt, is approximately ten degrees from horizontal. An adjustable clamping device 39 which extends transversely of the outer end of the platen is applied to the belt 35, outwardly of that portion thereof which is to be tapered, and said clamping device co-operates with the adhesive tape in securely holding the desired portion of the belt 35 onto the platen surface. The adjustability of the clamping device allows it to be shifted relative to the belt being worked on so as to apply even pressure thereon. Preferably the inclination of the platen 8 relative to the effective grinding surface $a$ of the belt is at an eight-to-one ratio, and the platen may be movable fore and aft on the upright supports 7.

The top surface of the platen, in practice, may be formed with gauge lines (not shown) and the end portion of the belt to be tapered or skived is aligned with proper gauge lines on the platen for the attainment of the proper splice or taper angle. The carriage for the grinding mechanism is originally adjusted so that the work pulley end of the grinding belt 38 slightly overhangs the inner transverse edge of the platen 8. Next, the adjusting screw 34 is turned downwardly to an extent which will permit the grinding surface of the grinding belt to barely contact the exposed surface of the work 35. The operator then manually moves the carriage fore and aft and transversely over the surface of the work. Thereafter the adjusting screw 34 is turned upwardly slightly which will permit the work end of the grinding mechanism to drop slightly and the next cut is made on the work 35 in the same manner with the carriage moving fore and aft and transversely to cover the complete surface of the work. This procedure is continued until the free end of the belt or work 35, along the inner transverse edge of the platen, is relatively thin, whereupon the proper taper for the splice will have been completed. In a similar manner the other end portion of the belt may be tapered so that the complementary tapers when completed may be overlapped and glued or otherwise secured together to provide an endless belt. The grinding belt 28 can be changed according to the type of work desired and a belt with a coarse abrasive is suitable for the roughing operations, whereas a belt with a finer abrasive thereon is suitable for the smoothing and finishing operations. Belt splices formed through the use of the improved belt splice former can be accomplished in a relatively short period of time, and this is true notwithstanding the fact that the belt may be multi-layered with different types of materials in the respective layers.

The improved belt splice former provides an adjustable, powered instrumentality for tapering the ends of work and for forming such tapers much more efficiently, accurately and expeditiously than can be accomplished through the use of a hand tool. The belt splice former is furthermore of simple construction, is relatively inexpensive to manufacture, is easy to operate, and is well adapted for the purposes set forth.

What is claimed as the invention is:

1. A bevelling machine, comprising a frame, an inclined stationary work supporting platen mounted thereon, a carriage, means mounting the carriage on the frame for longitudinal and transverse movement relative to the platen, said carriage including an arm, means pivotally mounting the arm on the carriage for rocking movement in an arc transverse to the plane of the platen, and a powered grinding mechanism operatively carried by the arm and extending to its outer end to contact and bevel the surface of work flatly supported on said platen when the carriage is moved longitudinally and transversely and the arm is rocked toward the platen and in conformity with its inclination.

2. A bevelling machine, comprising a frame having a base, a stationary platen mounted on the base at an angle to the plane of the base, a carriage, means mounting the carriage on the base for longitudinal and transverse movement relative to the platen in a plane parallel to the plane of the base, said carriage including an arm overhanging the platen, means pivotally mounting the arm on the carriage for yielding rocking movement in an arc transverse to the plane of the platen, means for removably securing work flatly on said platen, and a powered grinding mechanism operatively carried by the arm and extending to its outer end to contact and bevel the surface of work on said platen when the carriage is moved and the arm is rocked toward the platen in conformity with its angularity.

3. A bevelling machine, comprising a frame having a base, a stationary platen mounted on the base at an angle to the plane of the base, a carriage, means mounting the carriage on the base for longitudinal and transverse movement relative to the platen in a plane parallel to the plane of the base, said carriage including an arm overhanging the platen, means pivotally mounting the arm on the carriage for yielding rocking movement in an arc transverse to the plane of the platen, adjustable means for limiting the rocking movement of the arm, means for removably securing work flatly on said platen, and a powered grinding mechanism operatively carried by the arm and extending to its outer end to contact and bevel the surface of work on said platen when the carriage is moved and the arm is rocked toward the platen in conformity with its angularity.

4. A beveling machine, comprising a frame, a work supporting inclined stationary platen mounted thereon, a carriage, means mounting the carriage on the frame for manual longitudinal and transverse movement relative to the platen, said carriage including an arm, means pivotally mounting the arm on the carriage for yielding manual rocking movement in an arc transverse to the plane of the platen, and a motor-driven grinding mechanism operatively carried by the arm and positioned to selectively contact and bevel the surface of work flatly supported on said platen when the carriage is moved longitudinally and transversely and the arm is rocked in an arc toward the platen in conformity with its inclination.

5. In a beveling machine having a stationary platen mounted at an angle to horizontal, a carriage, means mounting the carriage for longitudinal and transverse movement relative to the platen in various horizontal planes, said carriage including an arm overhanging the platen, means pivotally mounting the arm on the carriage for yielding rocking movement in an arc substantially perpendicular to the plane of the platen, means for removably securing work flatly on said platen, and a powered grinding mechanism operatively carried by the arm and positionable to contact and bevel the surface of work on said platen when the carriage is moved and the arm is rocked in an arc toward the platen.

6. In a machine for forming bevels in work, a frame, a work supporting stationary platen mounted on the frame at a slight angle to horizontal, a carriage, means mounting the carriage on the frame for longitudinal and transverse movement in a horizontal plane relative to the platen, said carriage including an arm, means intermediately pivotally mounting the arm on the carriage for rocking movement in an arc transverse to the plane of the platen, means for limiting the rocking movement of the arm, and a power-operated grinding mechanism operatively mounted on and extending to the outer end portion of the arm to skive work supported on the platen in a predetermined plane upon rocking adjustment of the arm and fore and aft and transverse movement of the carriage relative to the platen.

7. In a machine for forming bevels in the ends of belting or the like, a frame, a carriage mounted on the frame to move fore and aft and transversely in a fixed plane, a work-supporting stationary platen mounted on the frame at an angle to the plane of movement of the carriage, said carriage including an arm overhanging the platen, means intermediately pivotally mounting the arm on the carriage for yielding rocking movement in an arc substantially perpendicular to the plane of movement of the carriage, means for adjustably limiting the inward rocking movement of the outer end of the arm, and a powered grinding mechanism operatively carried by the arm and extending to its outer end to contact and bevel the surface of work on said platen in predetermined planes depending upon the limit of rocking movement of the arm when the carriage is moved relative to the platen.

8. In combination, a frame having a base, a work-supporting stationary platen adjustably mounted on the base at a predetermined angle to the plane of the base, a carriage, means mounting the carriage on the base for longitudinal and transverse movement relative to the platen in a plane parallel to the plane of the base, said carriage including an arm overhanging the platen, means intermediately pivotally mounting the arm on the carriage for regulatable, yielding rocking movement in an arc transverse to the plane of the platen, adjustable means for limiting the rocking movement of the arm, pulleys mounted on opposite ends of said arm, an endless grinding belt engaging said pulleys, and a motor carried by said arm and drivingly engaging one of said pulleys.

References Cited in the file of this patent

UNITED STATES PATENTS

| | | |
|---|---|---|
| 275,385 | Howe | Apr. 10, 1883 |
| 521,077 | Barker | June 5, 1894 |
| 2,030,135 | Carpenter | Feb. 11, 1936 |
| 2,147,772 | Kallander | Feb. 21, 1939 |
| 2,206,899 | Kellgren | July 9, 1940 |
| 2,356,433 | Roech et al. | Aug. 22, 1944 |
| 2,573,220 | Riedesel | Oct. 30, 1951 |
| 2,574,152 | Lewis et al. | Nov. 6, 1951 |
| 2,726,489 | Hawkins | Dec. 13, 1955 |
| 2,752,734 | McGibbon | July 3, 1956 |